(12) United States Patent
Takahashi

(10) Patent No.: US 11,188,438 B2
(45) Date of Patent: Nov. 30, 2021

(54) INFORMATION PROCESSING APPARATUS, COMPUTER-READABLE RECORDING MEDIUM STORING PROGRAM, AND INFORMATION PROCESSING METHOD

(71) Applicant: FUJITSU LIMITED, Kawasaki (JP)

(72) Inventor: Akane Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 374 days.

(21) Appl. No.: 16/280,086

(22) Filed: Feb. 20, 2019

(65) Prior Publication Data
US 2019/0278686 A1 Sep. 12, 2019

(30) Foreign Application Priority Data
Mar. 8, 2018 (JP) .............................. JP2018-042075

(51) Int. Cl.
*G06F 9/44* (2018.01)
*G06F 11/34* (2006.01)

(52) U.S. Cl.
CPC ...... *G06F 11/3419* (2013.01); *G06F 11/3461* (2013.01); *G06F 11/3495* (2013.01); *G06F 2201/865* (2013.01)

(58) Field of Classification Search
CPC .................................................. G06F 11/3419

USPC .......................................................... 703/21
See application file for complete search history.

(56) References Cited

U.S. PATENT DOCUMENTS

| | | | | |
|---|---|---|---|---|
| 6,038,391 A * | 3/2000 | Kawaba | ............. | G06F 11/3419 703/21 |
| 2008/0028142 A1* | 1/2008 | Kleinschmidt | ..... | G06F 11/3485 711/112 |
| 2015/0234641 A1* | 8/2015 | Inada | .................. | G06F 9/45525 717/150 |

FOREIGN PATENT DOCUMENTS

| | | |
|---|---|---|
| JP | 11-096130 | 4/1999 |
| JP | 2014-099108 | 5/2014 |

* cited by examiner

*Primary Examiner* — Timothy A Mudrick
(74) *Attorney, Agent, or Firm* — Fujitsu Patent Center

(57) ABSTRACT

An information processing apparatus includes: a memory; and a processor coupled to the memory and the processor configured to calculate shortening rates by comparing execution times for each of a plurality of functions in a case where an evaluation target program is executed in an execution environment with execution times for each of the plurality of functions in a case where the evaluation target program is executed in a simulation environment, and generate a simulation program to be used in the simulation environment based on the calculated shortening rates and the evaluation target program.

11 Claims, 20 Drawing Sheets

FIG. 12B

DUMMY TRACE GENERATION PROGRAM

```
1:  /*ACQUIRE EXECUTION TRACE (extrace)*/
2:  extrace = get_trace();
3:  /*ACQUIRE SIMILARITY TRACE (simtrace)*/
4:  simtrace = get_simtrace();
5:
6:  /*ACQUIRE PROCESSING TIMES FOR EACH OF LINES
7:   OF TWO TRACES AND CALCULATE SHORTENING RATES*/
8:  extime[]; simtime[]; simfn[];
9:  for i in range (1, N) :
10:   /*ACQUIRE PROCESSING TIMES AND FUNCTION NAMES IN TRACES*/
11:   extime[i] = get_time( extrace[i] );
12:   simtime[i] = get_time( simtrace[i] );
13:   simfn[i] = get_fn( simtrace[i] );
14:
15:   /*CALCULATE SHORTENING RATES FOR EACH OF LINES OF TRACES*/
16:   r[i] = 1 - simtime[ i ] / extime[ i ];
17:
18:  /*ACQUIRE MINIMUM VALUE OF SHORTENING RATE*/
19:  R = min( r );
```

| EXECUTION TRACE EXECUTION TIME | SIMILARITY TRACE EXECUTION TIME | SHORTENING RATE |
|---|---|---|
| T_1 | Tsim_1 | r_1 = 1 - Tsim_1/T_1 |
| T_2 | Tsim_2 | r_2 = 1 - Tsim_2/T_2 |
| T_3 | Tsim_3 | r_3 = 1 - Tsim_3/T_3 |
| T_4 | Tsim_4 | r_4 = 1 - Tsim_4/T_4 |
| T_5 | Tsim_5 | r_5 = 1 - Tsim_5/T_5 |
| T_6 | Tsim_6 | r_6 = 1 - Tsim_6/T_6 |
| T_7 | Tsim_7 | r_7 = 1 - Tsim_7/T_7 |
| T_8 | Tsim_8 | r_8 = 1 - Tsim_8/T_8 |

FIG. 13A

| SHORTENING RATE | ADJUSTMENT TIME |
|---|---|
| r_1 = 1 − Tsim_1/T_1 | Δt_1 = T_1 × r_2 − Tsim_1 |
| r_2 = 1 − Tsim_2/T_2 | Δt_2 = T_2 × r_2 − Tsim_2 |
| r_3 = 1 − Tsim_3/T_3 | Δt_3 = T_3 × r_2 − Tsim_3 |
| r_4 = 1 − Tsim_4/T_4 | Δt_4 = T_4 × r_2 − Tsim_4 |
| r_5 = 1 − Tsim_5/T_5 | Δt_5 = T_5 × r_2 − Tsim_5 |
| r_6 = 1 − Tsim_6/T_6 | Δt_6 = T_6 × r_2 − Tsim_6 |
| r_7 = 1 − Tsim_7/T_7 | Δt_7 = T_7 × r_2 − Tsim_7 |
| r_8 = 1 − Tsim_8/T_8 | Δt_8 = T_8 × r_2 − Tsim_8 |

FIG. 13B

DUMMY TRACE GENERATION PROGRAM (CONTINUED)

```
20:
21: /*OUTPUT EACH OF LINES OF DUMMY TRACE*/
22: for j in range (1, N) :
23:   /*CALCULATE ADJUSTMENT TIMES FOR EACH OF LINES*/
24:   delta = extim[j] * R − simtime[j];
25:
26:   /*OUTPUT AS DUMMY TRACE*/
27:   print_trace(dummy_run, delta)
28:   print_trace(simfn[j], simtime[j]);
29:
30:
```

| | FUNCTION NAME | PROCESSING TIME |
|---|---|---|
| E1 | dummy_run | delta_1 |
| | similarity_fucntion_1 | Tsim_1 |
| E2 | similarity_fucntion_2 | Tsim_2 |
| E3 | dummy_run | delta_3 |
| | similarity_fucntion_3 | Tsim_3 |
| E4 | dummy_run | delta_4 |
| | similarity_fucntion_4 | Tsim_4 |
| | ⋮ | ⋮ |

DUMMY TRACE

DUMMY PROGRAM GENERATION PROGRAM — 303

```
1:  /*ACQUIRE FUNCTION UNDER DUMMY TRACE*/
2:  dummytrace = get_dummytrace();
3:
4:  for j in range (1, N) :
5:      dfunc = get_fn( dummytrace[ j ] );
6:      dtime = get_time( dummytrace[ j ] );
7:
8:      /*OUTPUT MAIN PROCESS OF DUMMY PROGRAM*/
9:      if dfunc == "dummy_run"
10:         print_fn( dummy_run( dtime ) );
11:     else :
12:         print_fn( dfunc );
13:
```

FIG. 15B

DUMMY PROGRAM — 304

```
1:  /*EXECUTION CONTENTS OF EACH THREAD*/
2:  def tread_main() :
3:      count = 0;
4:      while (1) :                                  ─┐
5:          /*                                        │
6:           * OUTPUT MAIN PROCESS OF DUMMY PROGRAM IN │─ F1
7:           * DUMMY PROGRAM GENERATION PROGRAM       │
8:           */                                       │
9:          count++;                                 ─┘
10: /*MAIN PROCESS OF SIMULATION*/
11: def simulation_main():
12:     /*GENERATE THREADS OF SPECIFIED DEGREE OF PARALLELISM(THNUM)*/
13:     for i in range( THNUM ) :
14:         create_threads( thread_main );
15:
16:     /*ACQUIRE PROCESSING AMOUNT PER UNIT TIME OF ALL THREADS*/
17:     while(1) :
18:         sleep(1);
19:         get_totalcount();
```

INFORMATION PROCESSING APPARATUS, COMPUTER-READABLE RECORDING MEDIUM STORING PROGRAM, AND INFORMATION PROCESSING METHOD

CROSS-REFERENCE TO RELATED APPLICATION

This application is based upon and claims the benefit of priority of the prior Japanese Patent Application No. 2018-42075, filed on Mar. 8, 2018, the entire contents of which are incorporated herein by reference.

FIELD

The embodiment discussed herein is related to an information processing apparatus, a computer-readable recording medium storing a program, and an information processing method.

BACKGROUND

A performance of a parallel calculation program may be evaluated by a parallel performance. The parallel performance is an indication of how much a program may adapt to parallelization of processing.

Since the parallel performance roughly estimated by source code analysis or the like from such as data dependency may be inaccurate, the parallel performance may be calculated by performing an execution performance evaluation.

Japanese Laid-open Patent Publication No. 2014-99108 and Japanese Laid-open Patent Publication No. 11-96130 are examples of the related art.

SUMMARY

According to an aspect of the embodiments, an information processing apparatus includes a memory; and a processor coupled to the memory and the processor configured to calculate shortening rates by comparing execution times for each of a plurality of functions in a case where an evaluation target program is executed in an execution environment with execution times for each of the plurality of functions in a case where the evaluation target program is executed in a simulation environment, and generate a simulation program to be used in the simulation environment based on the calculated shortening rates and the evaluation target program.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12A is a table illustrating shortening rates for each of functions in the information processing apparatus illustrated in FIG. 2, and FIG. 12B is a diagram illustrating an example of a dummy trace generation program;

FIG. 13A is a table illustrating adjustment times for each of functions in the information processing apparatus illustrated in FIG. 2, and FIG. 13B is the diagram illustrating the example of the dummy trace generation program;

FIG. 14 is a diagram illustrating an example of the dummy trace in the information processing apparatus illustrated in FIG. 2;

FIGS. 15A and 15B are diagrams illustrating examples of a dummy program generation program and a dummy program in the information processing apparatus illustrated in FIG. 2;

DESCRIPTION OF EMBODIMENTS

Figure 1B:
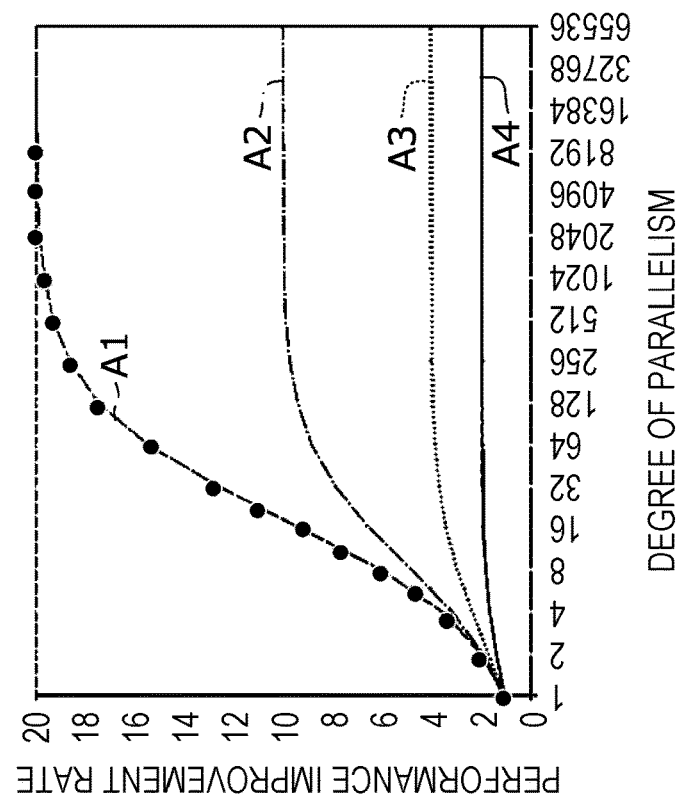
FIGS. 1A and 1B are graphs illustrating a relationship of performance improvement for a program parallelization.

For example, in a program under development, since it is capable of performing only for a sequential calculation and not for a parallel calculation, an accurate performance evaluation may not be possible. In the program under development, a measurement time may be prolonged by performing a plurality of performance measurements to acquire the parallel performance.

Hereinafter, an embodiment will be described with reference to the drawings. However, the following embodiment is merely an example, and there is no intention to exclude the application of various modifications and techniques not explicitly described in the embodiment. The present embodiment may be implemented with various modifications without departing from the gist thereof.

Each figure is not intended to include only the constituent elements illustrated in the drawing, however, may include other functions and the like.

Hereinafter, in the drawings, the same reference signs denote the same portions, and a description thereof will be omitted.

[A] Example of Embodiment

[A-1] System Configuration Example

Figure 1A:
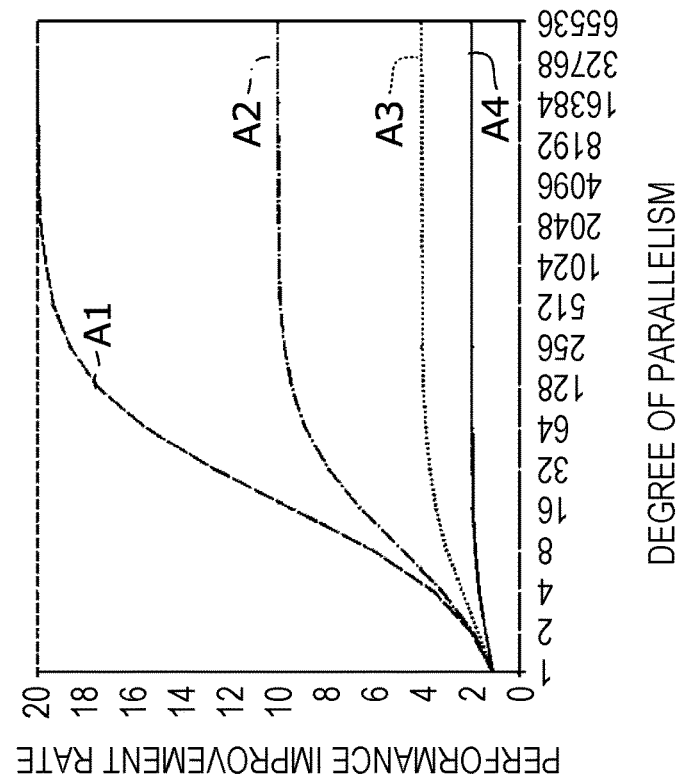

FIG. 1A is a graph illustrating a relationship of performance improvement for a program parallelization. In FIG. 1A, a horizontal axis represents a degree of parallelism such as a number of central processing unit (CPU) cores, and a vertical axis represents a performance improvement rate.

In FIG. 1A, a reference sign A1 indicates the parallel performance in a case where a proportion of a parallel portion to entire processing is 95%, and a reference sign A2 indicates the parallel performance in a case where a proportion of a parallel portion to the entire processing is 90%. A reference sign A3 indicates the parallel performance in a case where a proportion of a parallel portion to the entire processing is 75%, and a reference sign A4 indicates the parallel performance in a case where a proportion of a parallel portion to the entire processing is 50%.

The performance improvement rate, which is expressed to Speedup, of the program for the degree of parallelism is represented by the following (Expression 1).

$$Speedup(N) = \frac{T(1)}{T(N)} \qquad \text{(Expression 1)}$$

T(N) represents the time taken for the entire processing of a program, and N represents a degree of parallelism such as the number of CPU cores used.

In the graph illustrated in FIG. 1A, the parallel performance becomes higher as the curve approaches a linearly rising straight line. That is, in the example illustrated in FIG. 1A, the parallel performance is high in the order of the graphs indicated by reference signs A1, A2, A3, and A4.

When the performance improvement rate Speedup is calculated not by a processing time but by a processing amount, the following (Expression 2) is used.

$$Speedup(N) = \frac{P(N)}{P(1)} \qquad \text{(Expression 2)}$$

P(N) is the processing amount per unit time at the time of N parallel processing, for example.

FIG. 1B is a diagram illustrating a derivation example of the graph illustrated in FIG. 1A.

Figure 17:
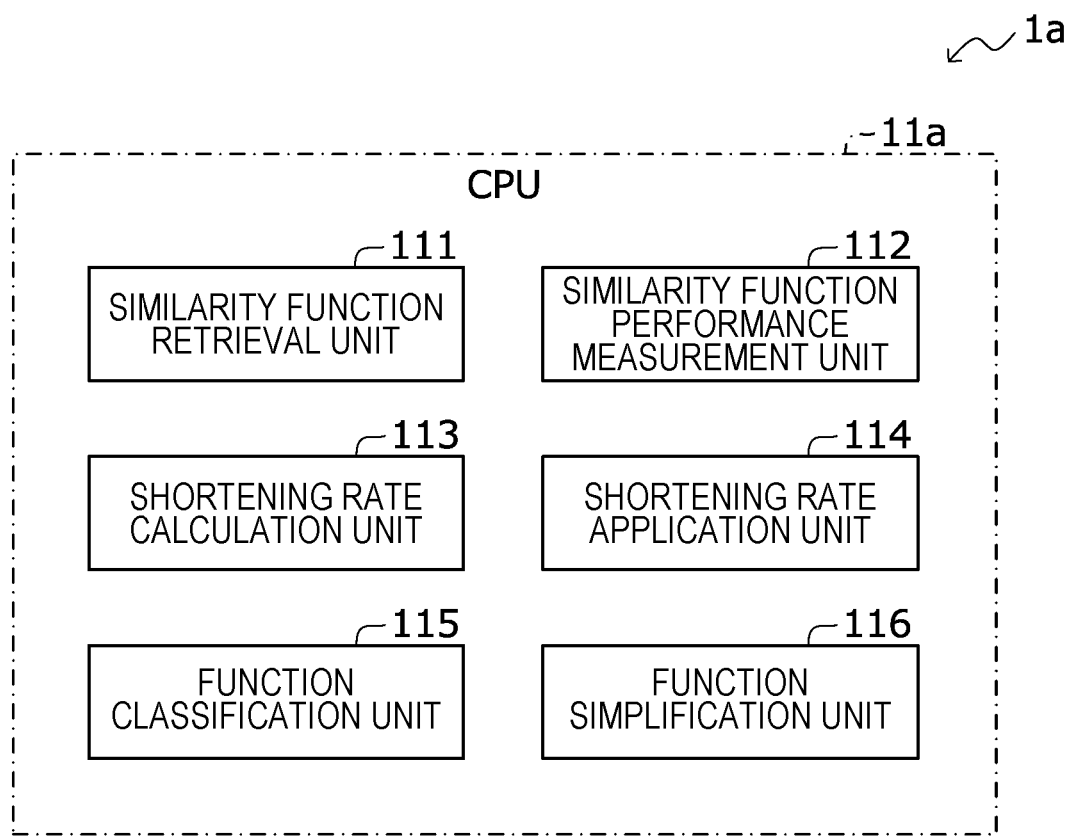
FIG. 17 is a block diagram schematically illustrating a functional configuration of an information processing apparatus in a modification example.

In the example illustrated in FIG. 1B, 17 points are plotted on the graph indicated by the reference sign A1. In order to calculate the accurate parallel performance, the performance improvement rate may be measured for each of a large number of processes as illustrated in the drawing.

Figure 2:
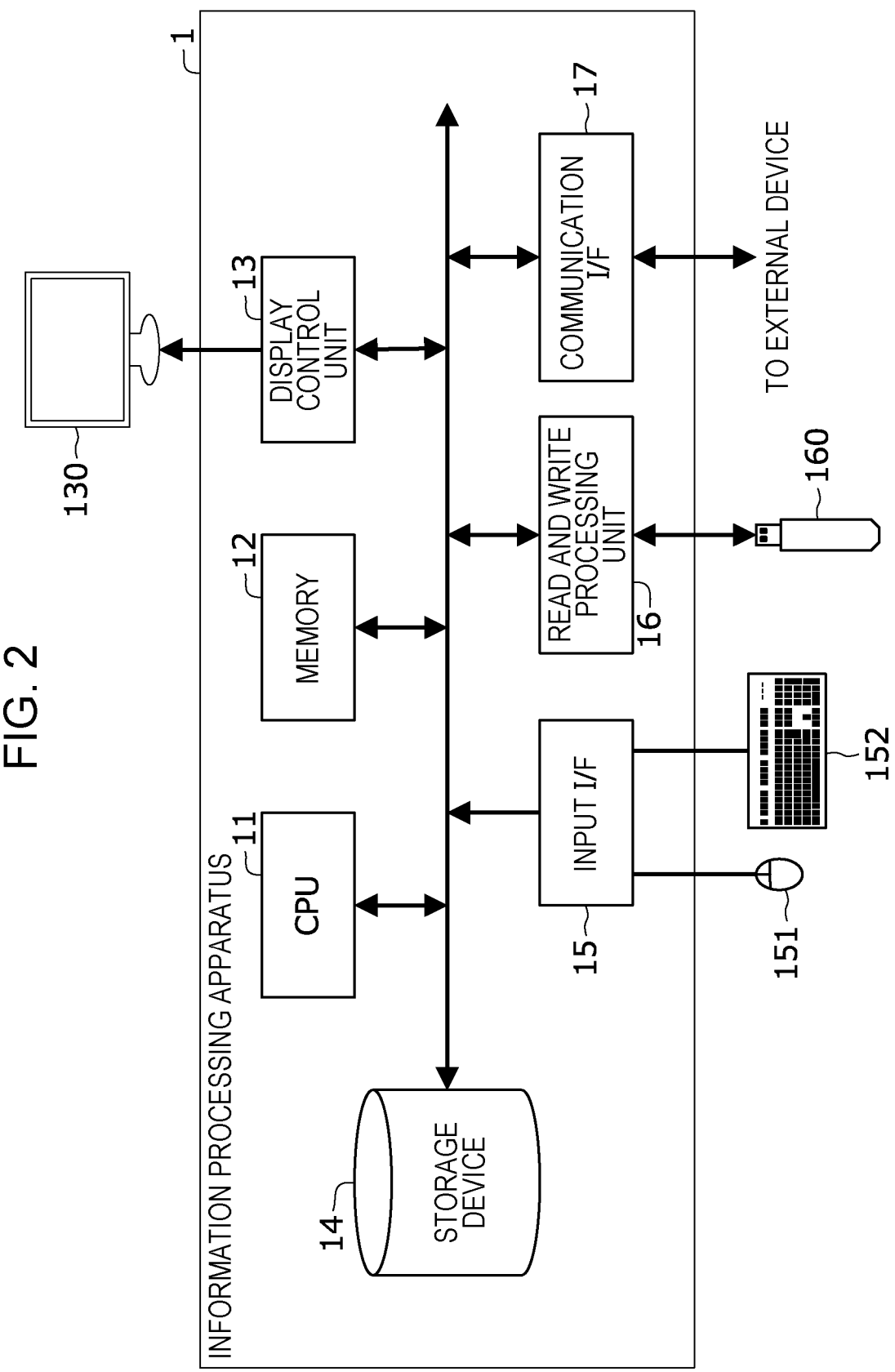
FIG. 2 is a block diagram schematically illustrating a hardware configuration of an information processing apparatus as an example of an embodiment.

FIG. 2 is a block diagram schematically illustrating a hardware configuration of an information processing apparatus 1 as an example of the embodiment.

The information processing apparatus 1 includes a CPU 11, a memory 12, a display control unit 13, a storage device 14, an input interface (I/F) 15, a read and write processing unit 16, and a communication I/F 17.

The memory 12 is illustratively a storage device including a read only memory (ROM) and a random access memory (RAM). In the ROM of the memory 12, a program such as a basic input/output system (BIOS) may be written. A software program of the memory 12 may be read and executed appropriately by the CPU 11. The RAM of the memory 12 may be used as a primary recording memory or a working memory.

The display control unit 13 is connected to a display device 130 and controls the display device 130. The display device 130 is a liquid crystal display, an organic light-emitting diode (OLED) display, a cathode ray tube (CRT), an electronic paper display, or the like, and displays various information for an operator or the like. The display device 130 may be combined with an input device, for example, a touch panel.

The storage device 14 is illustratively a device that stores data in a readable and writable manner, and for example, a hard disk drive (HDD), a solid state drive (SSD), a storage class memory (SCM) may be used.

The input I/F 15 is connected to an input device such as a mouse 151 and/or a keyboard 152, and controls the input device such as the mouse 151 or the keyboard 152. The mouse 151 or the keyboard 152 is an example of the input device, and the operator performs various input operations via these input devices.

The read and write processing unit 16 is configured so that a recording medium 160 may be mounted. The read and write processing unit 16 is configured to be capable of reading information recorded on the recording medium 160 in a state in which the recording medium 160 is mounted. In the example, the recording medium 160 has portability. For example, the recording medium 160 is a flexible disk, an optical disk, a magnetic disk, a magneto-optical disk, a semiconductor memory, or the like.

The communication I/F 17 is an interface for enabling communication with an external device.

Figure 3:
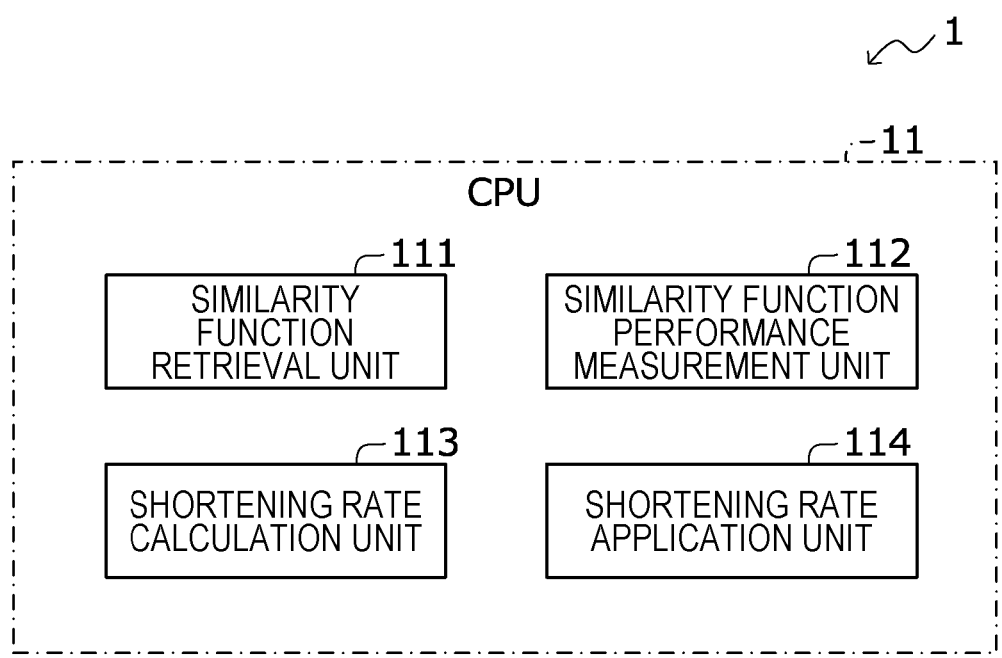
FIG. 3 is a block diagram schematically illustrating a functional configuration of the information processing apparatus illustrated in FIG. 2.

FIG. 3 is a block diagram schematically illustrating a functional configuration of the information processing apparatus 1 illustrated in FIG. 2.

The CPU 11 is a processing device that performs various controls and arithmetic operations, and implements various functions by executing an operating system (OS) and a program stored in the memory 12. As illustrated in FIG. 3, the CPU 11 of the information processing apparatus 1 functions as a similarity function retrieval unit 111, a similarity function performance measurement unit 112, a shortening rate calculation unit 113, and a shortening rate application unit 114.

A program for realizing the functions of the similarity function retrieval unit 111, the similarity function performance measurement unit 112, the shortening rate calculation unit 113, and the shortening rate application unit 114 is provided, for example, in a form recorded on the recording medium 160 which is described above. The computer reads the program from the recording medium 160 via the read and write processing unit 16, transfers and stores the program to the internal storage device or the external storage device, and uses the program. The program may be recorded in a storage device (recording medium) such as a magnetic disk, an optical disk, a magneto-optical disk or the like, and may be provided from the storage device to the computer via a communication path.

When implementing the functions of the similarity function retrieval unit 111, the similarity function performance measurement unit 112, the shortening rate calculation unit 113, and the shortening rate application unit 114, the program stored in the internal storage device is executed by a microprocessor of the computer. At this time, the computer may read and execute the program recorded in the recording medium 160. In the present embodiment, the internal storage device is the memory 12, and the microprocessor is the CPU 11.

The CPU 11 illustratively controls an operation of the entire information processing apparatus 1. A device for controlling the operation of the entire information processing apparatus 1 is not limited to the CPU 11, and may be, for example, any one of an MPU, a DSP, an ASIC, a PLD, and an FPGA. Devices for controlling the operation of the entire information processing apparatus 1 may be a combination of two or more of a CPU, an MPU, a DSP, an ASIC, a PLD, and an FPGA. The MPU is an abbreviation for micro processing unit, the DSP is an abbreviation for digital signal processor, and the ASIC is an abbreviation for application specific integrated circuit. The PLD is an abbreviation for programmable logic device, and the FPGA is an abbreviation for field programmable gate array.

The similarity function retrieval unit 111 is an example of a retrieval unit. The similarity function retrieval unit 111 retrieves a plurality of similarity functions similar to each of a plurality of functions included in a program under development 101 (described later with reference to FIG. 4 and the like) from a predetermined function list 206 (described later with reference to FIGS. 9 to 11 and the like). Details of functions in the similarity function retrieval unit 111 will be described later with reference to FIG. 6 and the like.

The similarity function performance measurement unit 112 is an example of a measurement unit. The similarity function performance measurement unit 112 measures execution times in a case where similarity functions retrieved by the similarity function retrieval unit 111 are executed in a simulation environment 20 (described later with reference to FIG. 4 and the like). Details of functions in the similarity function performance measurement unit 112 will be described later with reference to FIG. 6 and the like.

The shortening rate calculation unit 113 is an example of a calculation unit. The shortening rate calculation unit 113 compares execution times for each of the plurality of functions in a program development execution environment 10 (described later with reference to FIG. 4 and the like) with execution times for each of the plurality of functions in the simulation environment 20 (described later with reference to FIG. 4 and the like) to calculate shortening rates. The execution times for each of the plurality of functions in the program development execution environment 10 are execution times for each of a plurality of functions in a case where the program under development 101 (described later with reference to FIG. 4 and the like) is executed in the program development execution environment 10. The execution times for each of the plurality of functions in the simulation environment 20 are execution times for each of a plurality of functions in a case where the program under development 101 is executed in the simulation environment 20.

The shortening rate calculation unit 113 calculates shortening rates based on the execution times for each of the plurality of functions in the program development execution environment 10 (described later with reference to FIG. 4 and the like) and execution times for each of a plurality of similarity functions measured by the similarity function performance measurement unit 112.

Details of functions in the shortening rate calculation unit 113 will be described later with reference to FIG. 7 and the like.

The shortening rate application unit 114 is an example of a generation unit. The shortening rate application unit 114 generates a dummy program 304 (described later with reference to FIG. 15A and FIG. 15B and the like) to be used in the simulation environment 20 based on the shortening rate calculated by the shortening rate calculation unit 113 and the program under development 101.

The shortening rate application unit 114 generates the dummy program 304 by using a minimum shortening rate out of a plurality of shortening rates calculated for each of the plurality of functions.

The shortening rate application unit 114 generates the dummy program 304 based on a dummy trace 202 (described later with reference to FIG. 8 and the like) which records values obtained by multiplying processing times of each of the plurality of functions by the shortening rates.

Details of functions in the shortening rate application unit 114 will be described later with reference to FIG. 7 and the like.

Figure 4:
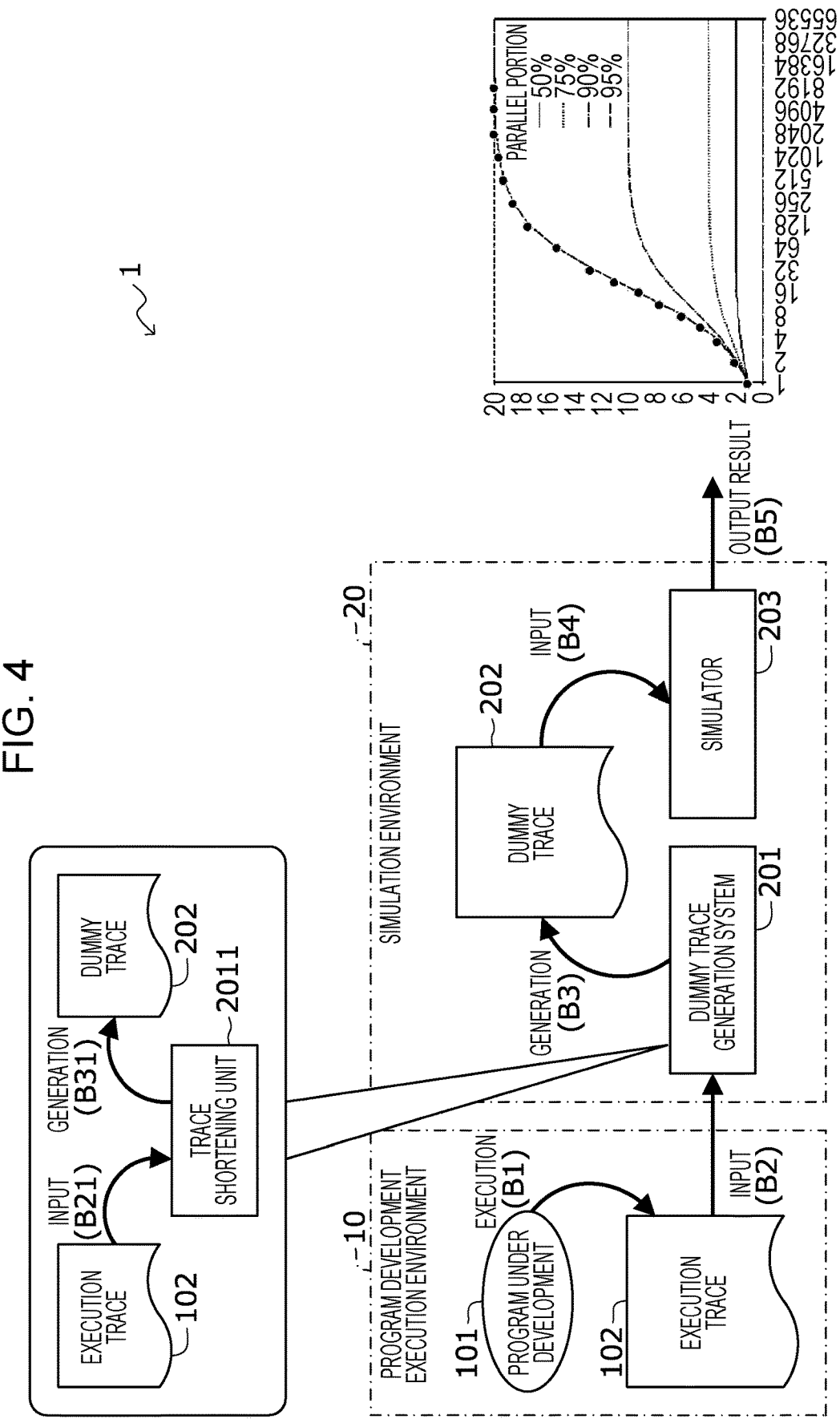
FIG. 4 is a block diagram explaining an outline of processing in the information processing apparatus illustrated in FIG. 2.

FIG. 4 is a block diagram explaining an outline of processing in the information processing apparatus 1 illustrated in FIG. 2.

The information processing apparatus 1 is divided into the program development execution environment (may be simply referred to as "execution environment") 10 and the simulation environment 20.

In the program development execution environment 10, a program under development (may be referred to as "evaluation target program") 101 is executed and an execution trace 102 is recorded (see reference sign B1).

In the simulation environment 20, a dummy trace generation system 201 generates the dummy trace 202 (see reference sign B3) with the execution trace 102 as an input (see reference sign B2).

In other words, the dummy trace generation system 201 functions as a trace shortening unit 2011. The trace shortening unit 2011 receives the execution trace 102 (see reference sign B2) as an input and generates the dummy trace 202 (see reference sign B3).

In the simulation environment 20, the generated dummy trace 202 is input to a simulator 203 (see reference sign B4) and the simulator 203 executes the program while changing a degree of parallelism. Then, the simulator 203 outputs a simulation result (see reference sign B5).

Figure 5B:
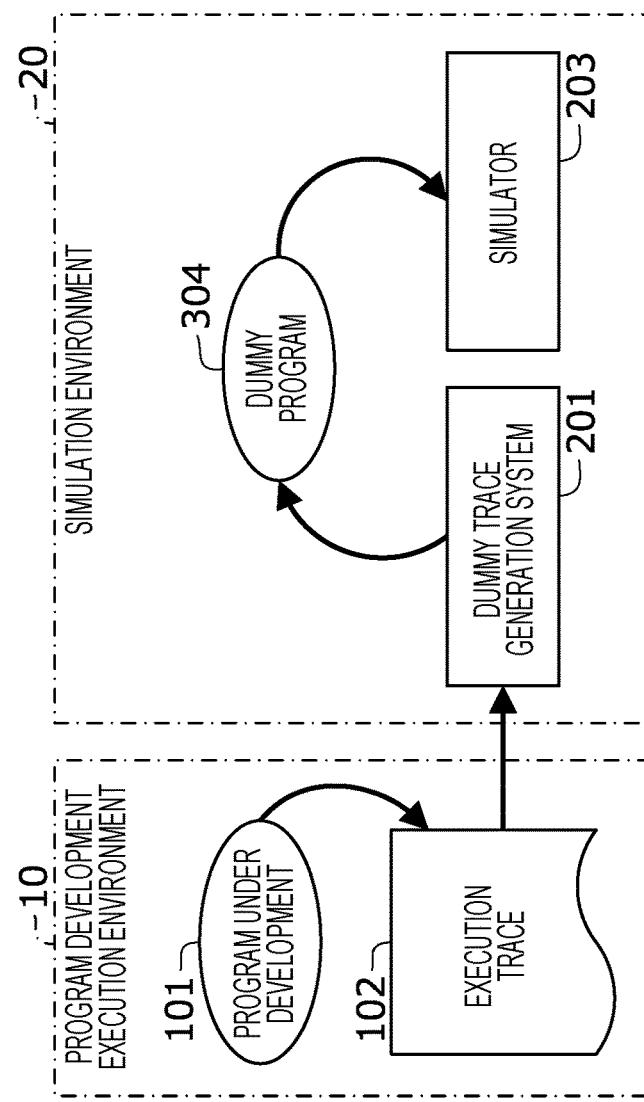
FIG. 5B is a block diagram explaining a generation process of a dummy program in the information processing apparatus illustrated in FIG. 2.
Figure 5A:
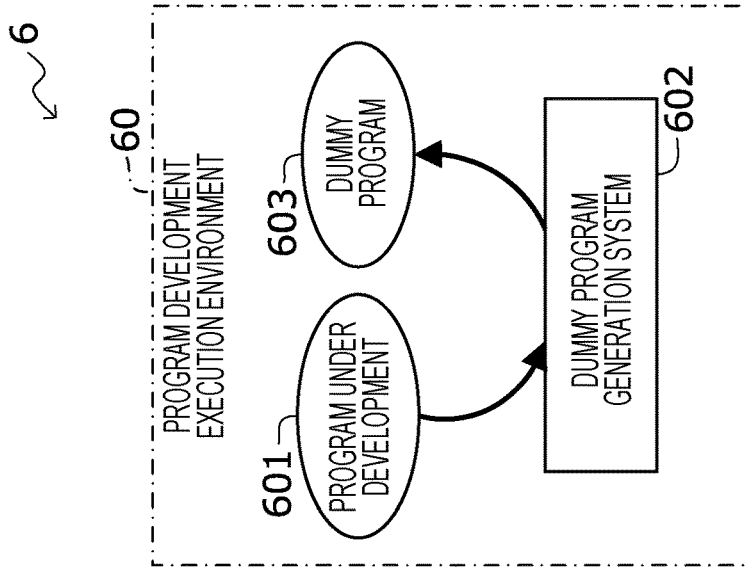
FIG. 5A is a block diagram explaining a generation process of a dummy program in a related example.

FIG. 5A is a block diagram explaining a generation process of a dummy program 603 in a related example. FIG. 5B is a block diagram explaining a generation process of a dummy program 304 in the information processing apparatus 1 illustrated in FIG. 2.

As illustrated in FIG. 5A, in a program development execution environment 60 developed in an information processing apparatus 6 according to the related example, a dummy program generation system 602 directly generates a dummy program 603 from a program under development 601.

As described above, a generation of the dummy program 603 in the related example has to be performed in a state where the program development execution environment 60 is in place. Further, a processing time of the dummy program 603 becomes the same as a processing time of the program under development 601.

On the other hand, as illustrated in FIG. 5B, in the program development execution environment 10 developed in the information processing apparatus 1 according to one example of the embodiment, the execution trace 102 is generated based on the program under development 101. In the simulation environment 20, the dummy trace generation system 201 receives an input of the execution trace 102 and generates a dummy program 304. Then, in the simulation environment 20, the simulator 203 executes the dummy program 304.

In this manner, the generation of the dummy program 304 in one example of the embodiment may be executed in the simulation environment 20 even if the program development execution environment 10 is not in place. Further, a processing time of the dummy program 304 may become shorter than a processing time of the program under development 101.

Figure 6:
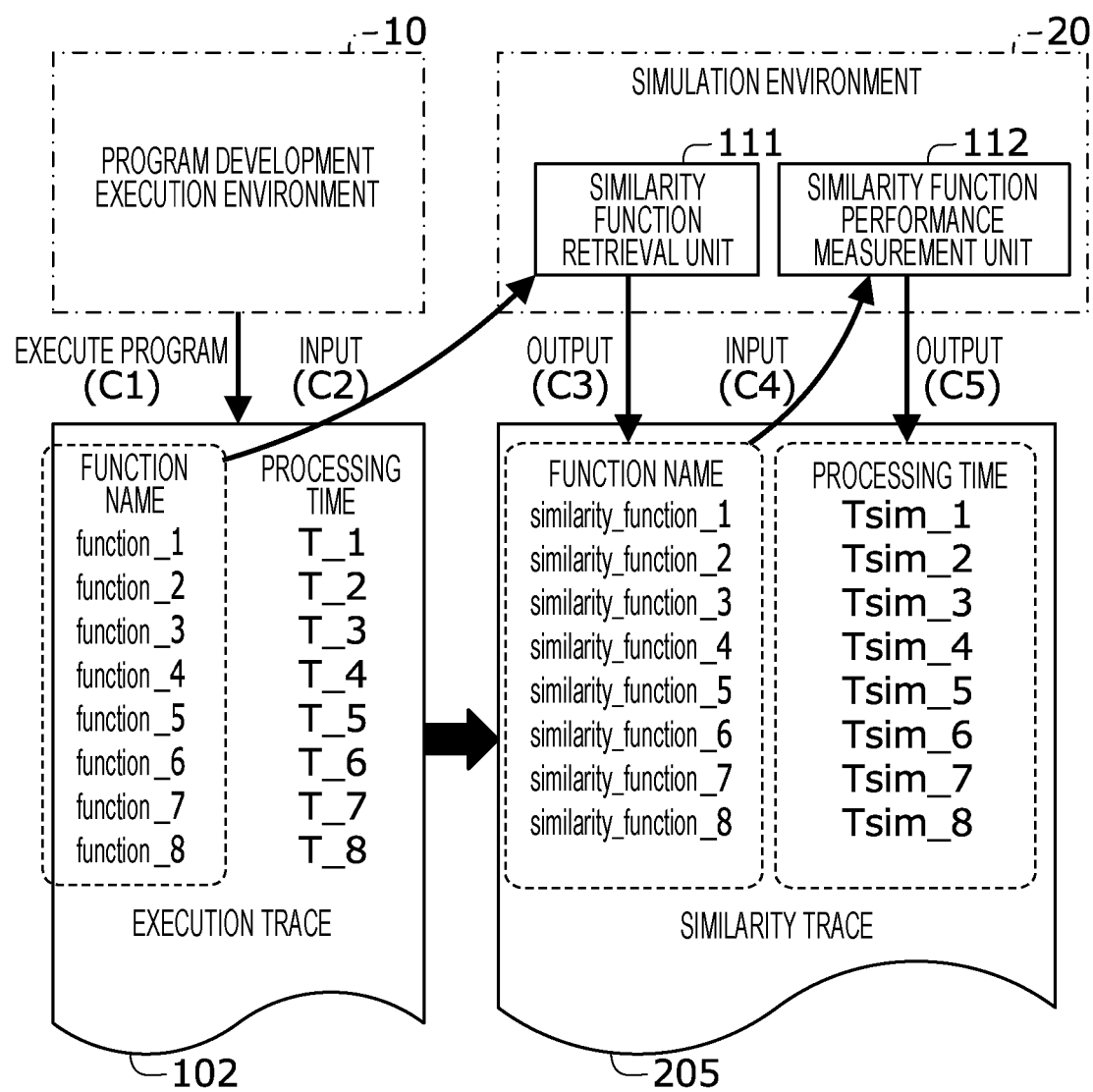
FIG. 6 is a block diagram explaining a generation process of a dummy trace in the information processing apparatus illustrated in FIG. 2.
Figure 7:
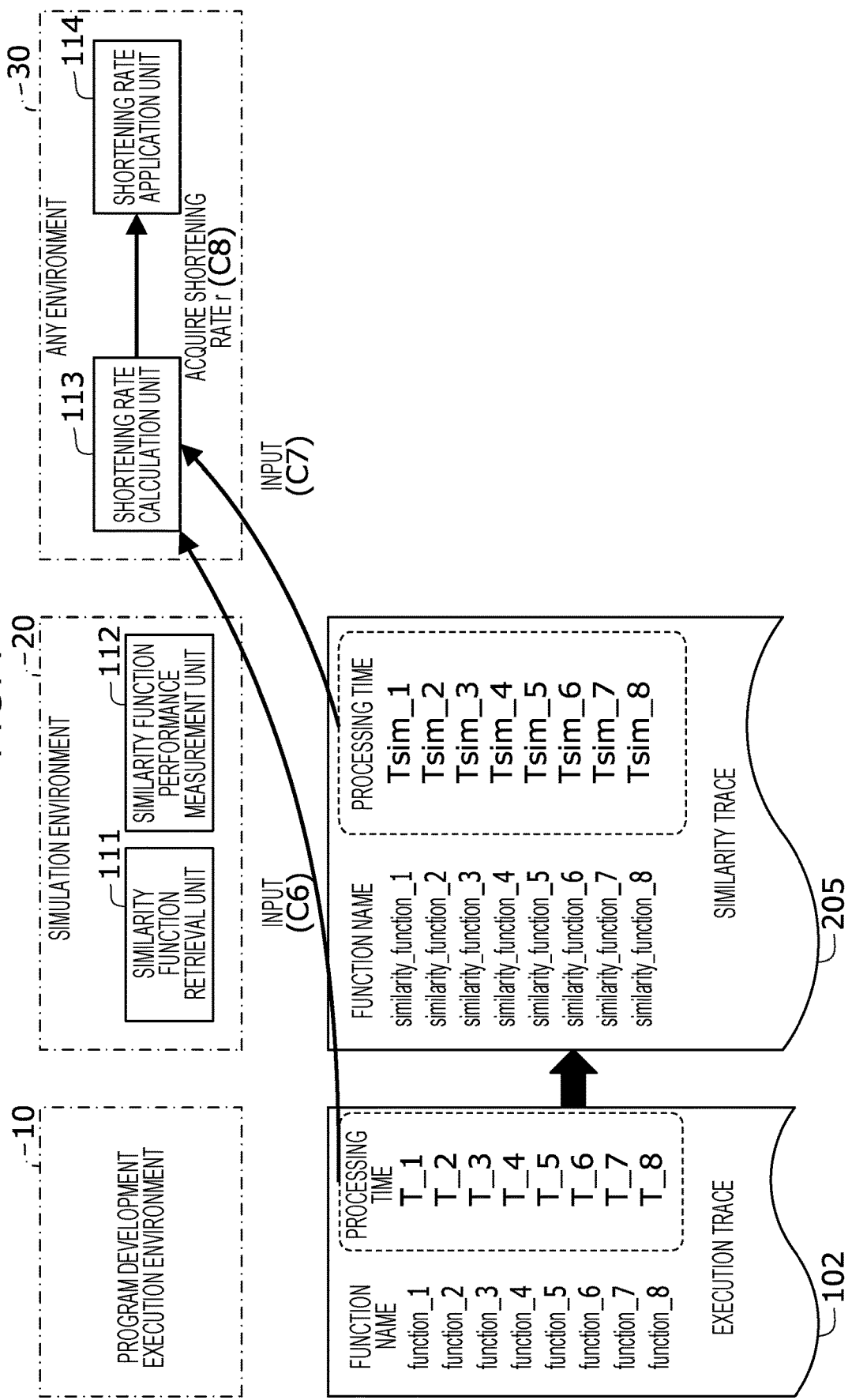
FIG. 7 is a block diagram explaining the generation process of the dummy trace in the information processing apparatus illustrated in FIG. 2.
Figure 8:
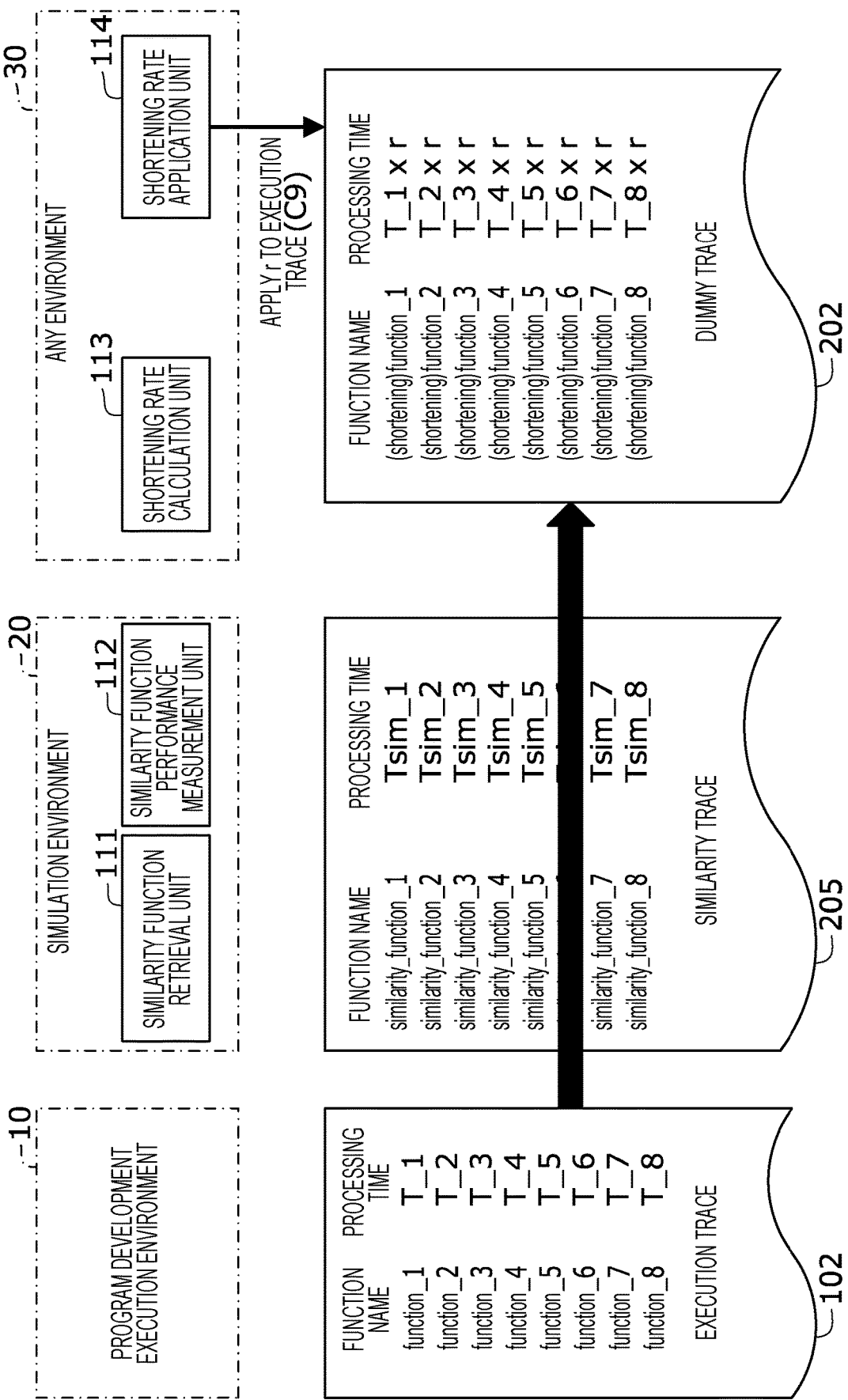
FIG. 8 is a block diagram explaining the generation process of the dummy trace in the information processing apparatus illustrated in FIG. 2.

FIGS. 6 to 8 are block diagrams explaining a generation process of a dummy trace 202 in the information processing apparatus 1 illustrated in FIG. 2.

As illustrated in FIG. 6, the program under development 101 is executed in the program development execution environment 10 (see reference sign C1 in FIG. 6), thereby the execution trace 102 is generated.

In the simulation environment 20, the similarity function retrieval unit 111 receives functions of the execution trace 102 as an input (see reference sign C2 in FIG. 6), retrieves similarity functions similar to each function of the execution trace 102, and outputs the similarity functions to a similarity trace 205 (see reference sign C3 in FIG. 6).

In the simulation environment 20, the similarity function performance measurement unit 112 receives function names of the similarity trace 205 as an input (see reference sign C4 in FIG. 6), measures a processing time for each similarity function of the similarity trace 205, and outputs the processing times to the similarity trace 205 (see reference sign C5 in FIG. 6).

As illustrated in FIG. 7, in any environment 30, a shortening rate calculation unit 113 receives the processing times of the execution trace 102 as an input (refer to reference sign C6 in FIG. 7) and also receives the processing times of the similarity trace 205 as an input (see reference sign C7 in FIG. 7). Then, the shortening rate calculation unit 113 calculates a shortening rate r by comparing the processing time of the execution trace 102 with the processing time of the similarity trace 205.

A shortening rate r_N for a function_N may be calculated by the following (Expression 3).

$$r\_N = 1 - \frac{Tsim\_N}{T\_N} \quad \text{(Expression 3)}$$

T_N represent processing times in the execution trace 102, $T_{sim}$_N represent processing times in the similarity trace 205, and N is a natural number.

The shortening rate calculation unit 113 inputs the minimum value out of the shortening rates r_N for each of the function_N as a shortening rate r to a shortening rate application unit 114.

In any environment 30, the shortening rate application unit 114 acquires the shortening rate r from the shortening rate calculation unit 113 (see reference sign C8 in FIG. 7).

As illustrated in FIG. 8, the shortening rate application unit 114 applies the shortening rate r to the execution trace 102, and generates a dummy trace 202 (see reference sign C9 in FIG. 8). The shortening rate application unit 114 acquires processing times of shortening functions T_N×r in the dummy trace 202 by multiplying the processing time of each function in the execution trace 102 by the shortening rate r.

Figure 9:
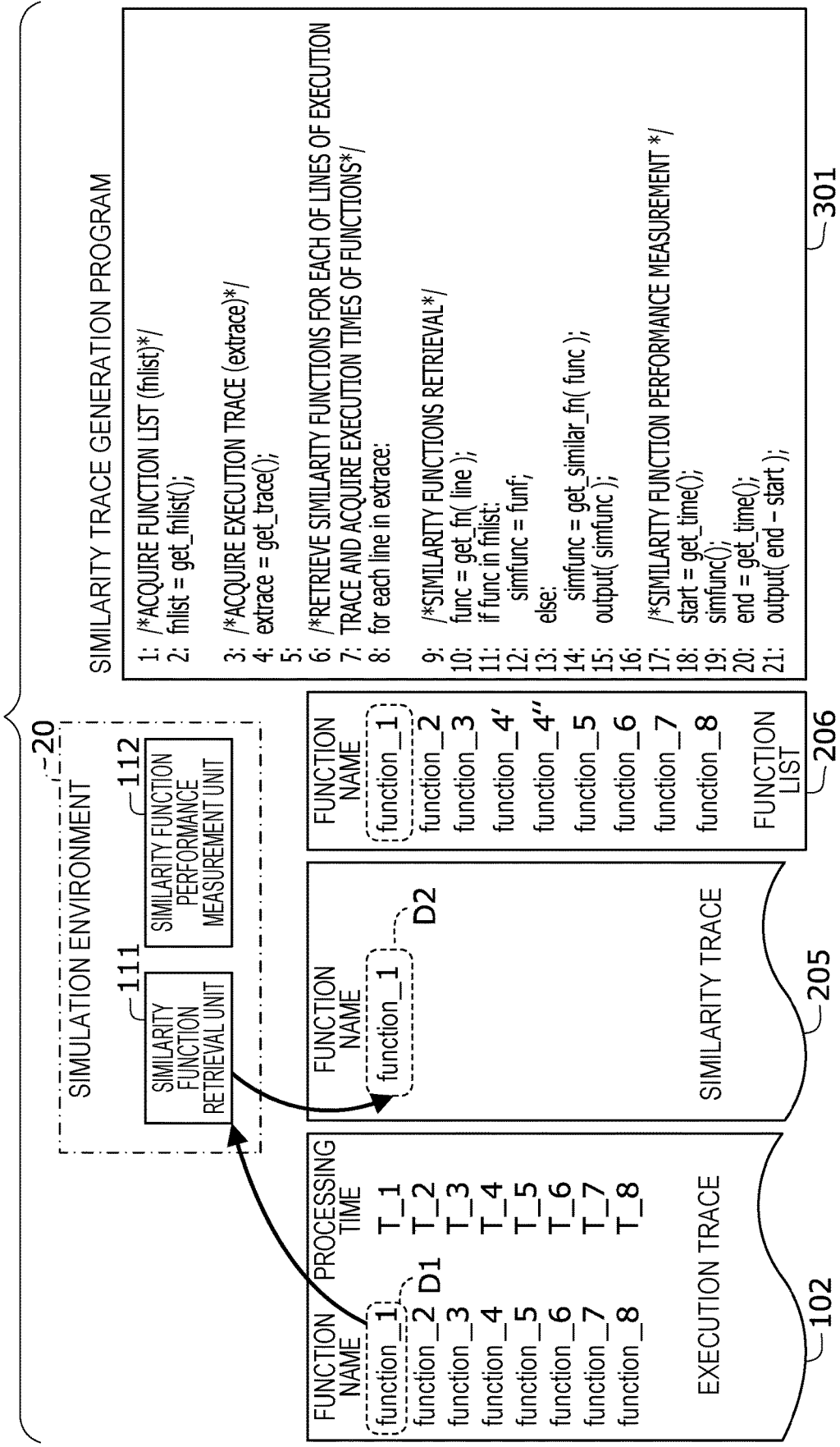
FIG. 9 is a block diagram explaining the generation process of a similarity trace in the information processing apparatus illustrated in FIG. 2.
Figure 10:
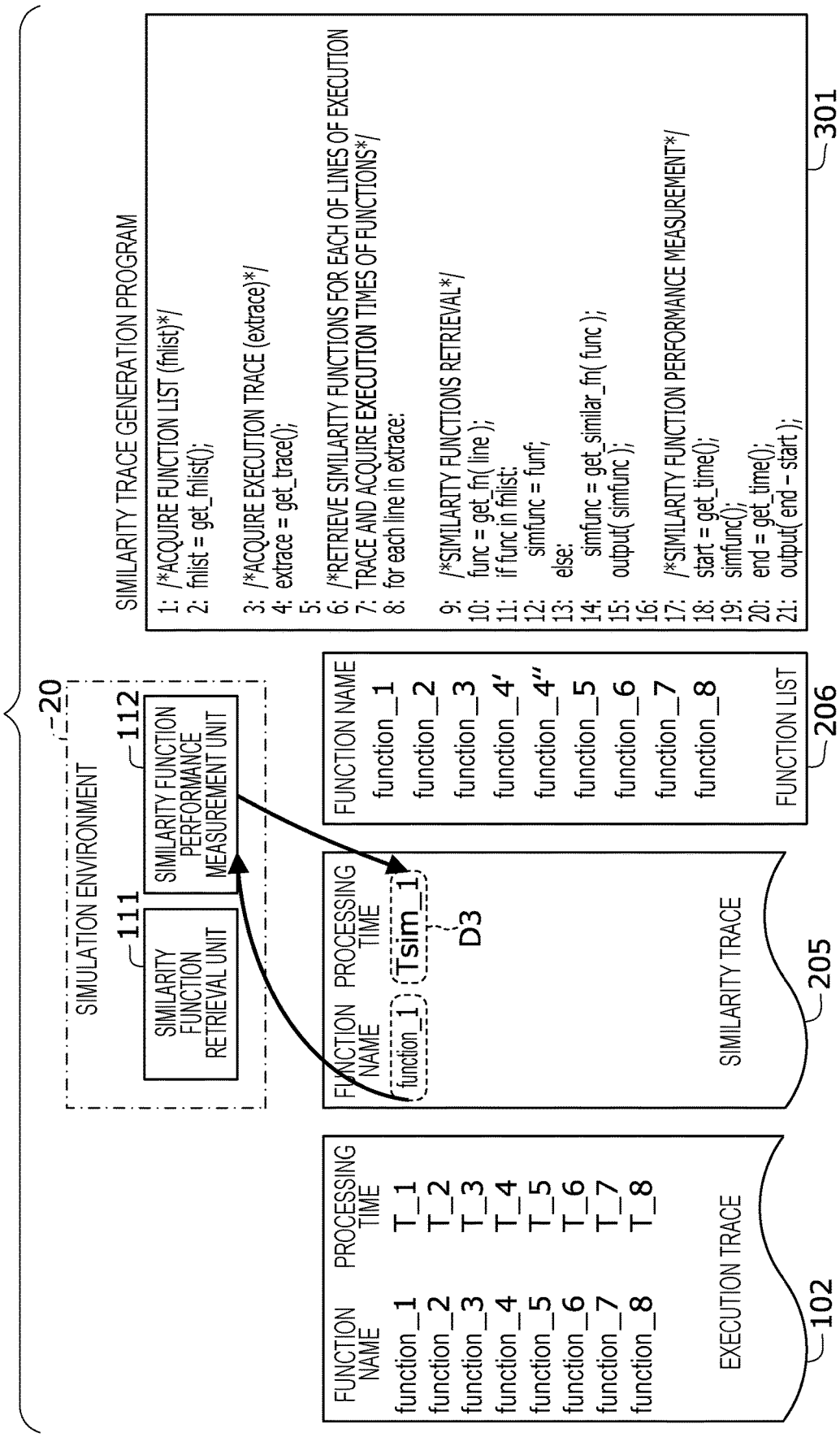
FIG. 10 is a block diagram explaining the generation process of the similarity trace in the information processing apparatus illustrated in FIG. 2.
Figure 11:
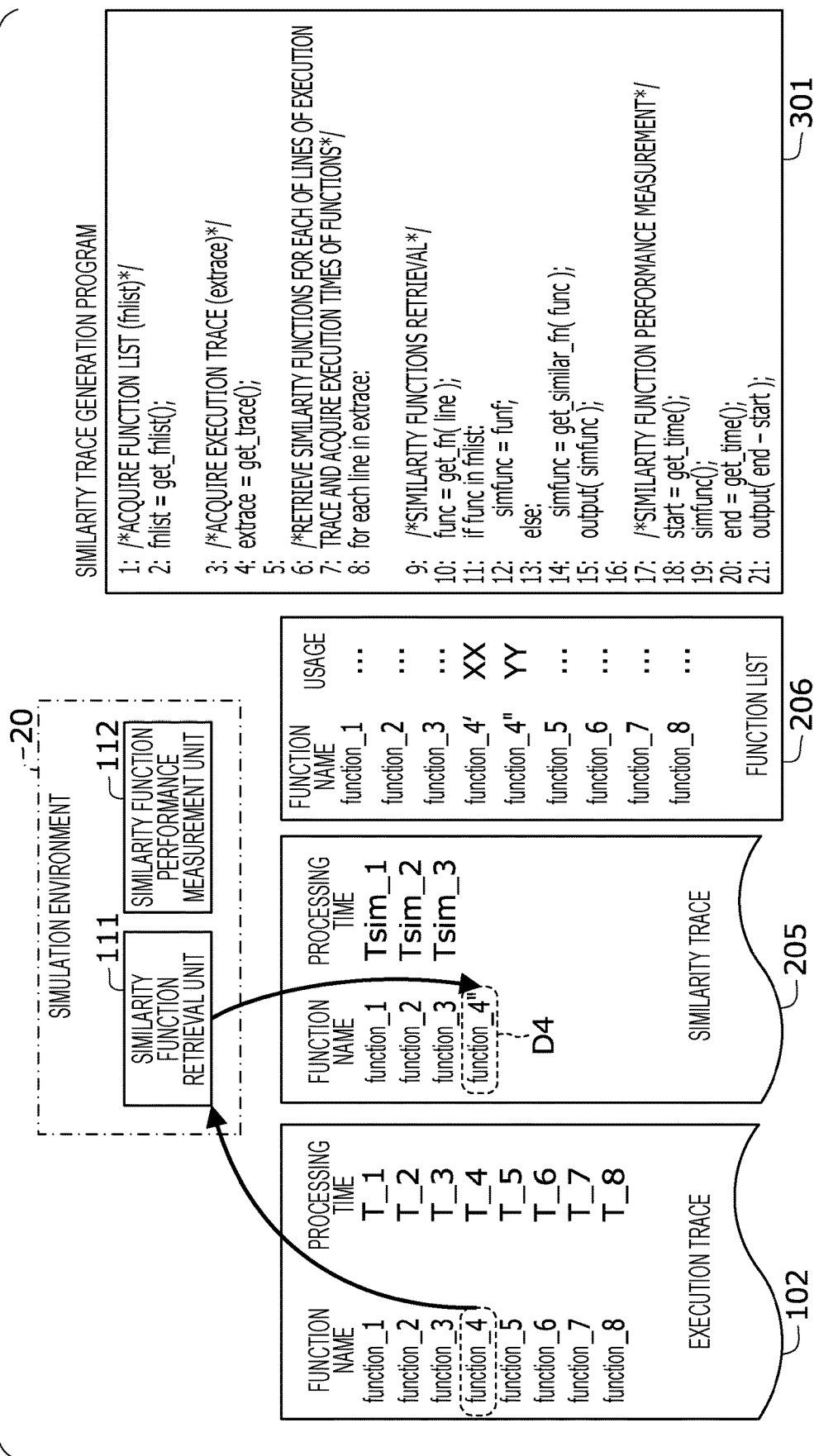
FIG. 11 is a block diagram explaining the generation process of the similarity trace in the information processing apparatus illustrated in FIG. 2.

FIGS. 9 to 11 are block diagrams explaining a generation process of a similarity trace 205 in the information processing apparatus 1 illustrated in FIG. 2.

As illustrated in FIG. 9, in the simulation environment 20, the similarity function retrieval unit 111 selects one function ("function_1" in the example illustrated in FIG. 9) in the execution trace 102 (see reference sign D1 in FIG. 9 and a 10th line of the similarity trace generation program 301). The similarity function retrieval unit 111 retrieves a similarity function ("function_1" in the example illustrated in FIG. 9) similar to the selected function from a function list 206 including a plurality of similarity functions. Then, the similarity function retrieval unit 111 registers the retrieved similarity function in a similarity trace 205 (see reference sign D2 in FIG. 9 and the 11th to 12th, and the 15th lines of the similarity trace generation program 301).

The program describing the processing by the similarity function retrieval unit 111 is represented by 1st to 15th lines of the similarity trace generation program 301, for example.

In the similarity trace generation program 301 exemplified in FIG. 9, 1st to 2nd lines include an acquisition process of the function list 206, and 3rd to 4th lines include an acquisition process of the execution trace 102. In the similarity trace generation program 301 exemplified in FIG. 9, the 6th to 21st lines include processing of retrieving similarity functions for each of lines of the execution trace 102 and acquiring execution times of the retrieved similarity functions. The 9th to 15th lines out of the 6th to 21st lines include a retrieval process of similarity functions.

As illustrated in FIG. 10, in the simulation environment 20, the similarity function performance measurement unit 112 measures a processing time ("$T_{sim}$_1" in the example illustrated in FIG. 10) of the similarity function ("function_1" in the example illustrated in FIG. 10) in the similarity trace 205 (see reference sign D3 in FIG. 10 and the 18th to 21st lines of the similarity trace generation program 301).

The program describing the processing by the similarity function performance measurement unit 112 is represented by the 6th to 8th lines and the 17th to 21st lines of the similarity trace generation program 301, for example.

In the similarity trace generation program 301 exemplified in FIG. 10, the 6th to 21st lines include processing for retrieving similarity functions for each of the lines of the execution trace 102 and acquiring execution times of the retrieved similarity functions. The 17th to 21st lines out of the 6th to 21st lines include an acquisition process of the execution times of the similarity functions.

In the example illustrated in FIG. 11, in the simulation environment 20, the similarity function retrieval unit 111 retrieves a similarity function similar to a function_4 in the execution trace 102 from the function list 206. In the example illustrated in FIG. 11, the function list 206 includes a function_4' and a function_4" as similarity functions similar to the function_4 of the execution trace 102.

The function_4' and the function_4" may be selectively used depending on the purpose of the function in the execution trace 102 and the size of the code. In the example illustrated in FIG. 11, the function_4' is used when the usage of the function_4 in the execution trace 102 is "XX", whereas the function_4" is used when the usage of the function_4 in the execution trace 102 is "YY".

In the example illustrated in FIG. 11, since the usage of the function_4 in the execution trace 102 is "YY", the similarity function retrieval unit 111 selects the function_4" from the function list 206 as a similarity function. Then, the similarity function retrieval unit 111 registers the selected function_4" in a similarity trace 205 (see reference sign D4 in FIG. 11 and the 13th to 15th lines of the similarity trace generation program 301).

FIG. 12A is a table illustrating shortening rates for each of the functions in the information processing apparatus 1 illustrated in FIG. 2. FIG. 12B is a block diagram illustrating an example of a dummy trace generation program 302 in the information processing apparatus 1 illustrated in FIG. 2.

In the table illustrated in FIG. 12A, the execution trace execution time, the similarity trace execution time, and the shortening rate are associated and registered.

The execution trace execution time indicates the execution times (in other words, the processing times) of the functions in the execution trace 102. The similarity trace execution time indicates the execution times (in other words, the processing times) of the similarity functions in the similarity trace 205. The shortening rate indicates proportions of shortening similarity trace execution times to execution trace execution times.

In the example illustrated in FIG. 12A, for example, a shortening rate r_1 indicated in the following (Expression 4) is associated with an execution trace execution time T_1 and a similarity trace execution time $T_{sim}\_1$.

$$r\_1 = 1 - \frac{Tsim\_1}{T\_1} \quad \text{(Expression 4)}$$

A shortening rate r_N for a function_N may be calculated by the above-described (Expression 3).

In the example illustrated in FIG. 12B, the dummy trace generation program 302 includes an acquisition process of the execution trace 102 in the 1st to 2nd lines and includes an acquisition process of the similarity trace 205 in the 3rd to 4th lines. The dummy trace generation program 302 includes processing for acquiring processing times for each line of the two traces 102 and 205 in the 6th to 16th lines and calculating the shortening rate, and includes processing for acquiring processing times and function names in the trace 102 and 205 in the 10th to 13th lines. The dummy trace generation program 302 includes processing for calculating the shortening rates in each line of the traces 102 and 205 in the 15th to 16th lines, and includes processing for acquiring the minimum value of the shortening rate in the 18th to 19th lines.

FIG. 13A is a table illustrating adjustment times for each of the functions in the information processing apparatus 1 illustrated in FIG. 2. FIG. 13B is a diagram illustrating an example of a continuation of the dummy trace generation program 302 illustrated in FIG. 12B.

In the table illustrated in FIG. 13A, the shortening rates and the adjustment times are registered in association.

The shortening rate indicates proportions of shortening the similarity trace execution times to execution trace execution times. The adjustment time is a value to be added to the execution time of each similarity function (in other words, additional processing time) so that the execution time of each similarity function looks like being shortened at the same shortening rate (the minimum value r_2 of the shortening rate in the example illustrated in FIG. 13A).

In the example illustrated in FIG. 13A, for example, an adjustment time Δt_1 is associated with a shortening rate r_1.

The shortening rate r_1 may be indicated by the above-described (Expression 4) similarly to the shortening rate r_1 illustrated in FIG. 12A.

The adjustment time Δt_1 may be indicated by the following (Expression 5).

$$\Delta t\_1 = T\_1 \times r\_2 - T\text{sim}\_1 \quad \text{(Expression 5)}$$

The r_2 indicates the minimum shortening rate out of the shortening rates with respect to the plurality of similarity functions. In the example illustrated in FIG. 13A, out of the shortening rates r_1 to r_8, the shortening rate r_2 of the execution time $T_{sim}\_2$ of the similarity_function_2 with respect to the execution time T_2 of the function_2, is the minimum.

An adjustment time Δt_N for a similarity_function_N (N is a natural number) may be indicated by the following (Expression 6).

$$\Delta t\_N = T\_N \times r\_\text{min} - T\text{sim}\_N \quad \text{(Expression 6)}$$

An r_min indicates the minimum shortening rate out of the shortening rates with respect to the plurality of similarity functions.

In the example illustrated in FIG. 13B, the dummy trace generation program 302 includes an output process of each line of the dummy trace 202 in the 21st to 28th lines, and includes processing for calculating an adjustment time of each line of the dummy trace 202 in the 23rd to 24th lines. The dummy trace generation program 302 includes processing for outputting the function name of the dummy function, the processing time of the dummy function (in other words, the adjustment time), the function name of the similarity function, and the processing time of the similarity function as the dummy trace 202 in the 26th to 28th lines.

The dummy trace generation program 302 treats one line for executing the dummy function and one line for executing the similarity function as one group in the dummy trace 202 to be generated, so that the similarity functions are executed with the execution times using the minimum shortening rate. The processing times of each of the similarity functions in the dummy trace 202 may be made to appear to have been shortened at the same shortening rate.

When the execution time of each function in the execution trace 102 is indicated by a ratio (in other words, a proportion occupied by the execution time of each function in the processing time of the entire execution trace 102), and when the ratio is maintained, a parallel performance is accurately evaluated even when the actual execution time is shortened.

The parallel performance depends on an execution timing of each thread in a parallel program. For example, a program includes processing that is capable of being executed in parallel and processing that is not capable of being executed in parallel (in other words, processing in which same operations may not be executed simultaneously by a plurality of threads). When such a program is executed in parallel by a plurality of threads, the processing performance of the parallel program changes depending on which processing and timing each thread has executed.

Therefore, unless the execution time of each function in the execution trace 102 is shortened by the same shortening rate, the operation of each thread (in other words, the execution timing of each function) may be different from the operation of the thread to be measured.

In one example of the present embodiment, the processing time of each function in the execution trace 102 is shortened at the same shortening rate so that accurate parallel performance is able to be obtained even if the execution time is shortened.

FIG. 14 is a diagram illustrating an example of the dummy trace 202 in the information processing apparatus 1 illustrated in FIG. 2.

The dummy trace 202 illustrated in FIG. 14 is generated based on the table illustrated in FIG. 12A and FIG. 13A.

In the example illustrated in FIG. 14, immediately before processing of a similarity_function_1 with a processing time $T_{sim\_}1$, a similarity_function_3 with a processing time $T_{sim\_}3$, and a similarity_function_4 with a processing time $T_{sim\_}4$, a dummy function indicated by dummy_run is inserted respectively. Specifically, a dummy_run with a processing time of delta_1 is inserted immediately before the similarity_function_1 (see reference sign E1). A dummy_run with a processing time of delta_3 is inserted immediately before the similarity_function_3 (see reference sign E3). A dummy_run with a processing time of delta_4 is inserted immediately before the similarity_function_4 (see reference sign E4).

On the other hand, in the example illustrated in FIG. 14, as described with reference to FIG. 13A, regarding the similarity_function_2 related to the minimum shortening rate out of the shortening rates for the plurality of similarity functions, the dummy function is not inserted immediately before the similarity_function_2 (see reference sign E2).

FIG. 15A is a block diagram illustrating an example of a dummy program generation program 303 in the information processing apparatus 1 illustrated in FIG. 2. FIG. 15B is a block diagram illustrating an example of a dummy program 304 in the information processing apparatus 1 illustrated in FIG. 2.

In the dummy program generation program 303 illustrated in FIG. 15A, the 1st to 6th lines include processing for acquiring functions in the dummy trace 202, and the 8th to 12th lines include processing for outputting a main process of the dummy program 304.

In the dummy program 304 illustrated in FIG. 15B, the 1st to 9th lines include execution contents of each thread, and the 10th to 19th lines include the main process of simulation. The 12th to 14th lines include processing for generating threads of the specified degree of parallelism, and the 16th to 19th lines include processing for acquiring a processing amount per unit time of all the threads.

In the area indicated by a reference sign F1 in the dummy program 304, an execution result of processing for outputting the main process to the dummy program 304 in the dummy program generation program 303 (the 8th to 12th lines in the example illustrated in FIG. 15A) is output.

In this way, by executing the dummy program 304, the number of threads executing the dummy trace 202 is generated by the number specified by the degree of parallelism. Then a processing amount of all threads per unit time (for example, the maximum execution number of traces) is obtained, a performance improvement rate in a case where the degree of parallelism is one is calculated, and a calculation results are plotted on a graph as illustrated in FIG. 1B.

[A-2] Operation Example

Figure 16:
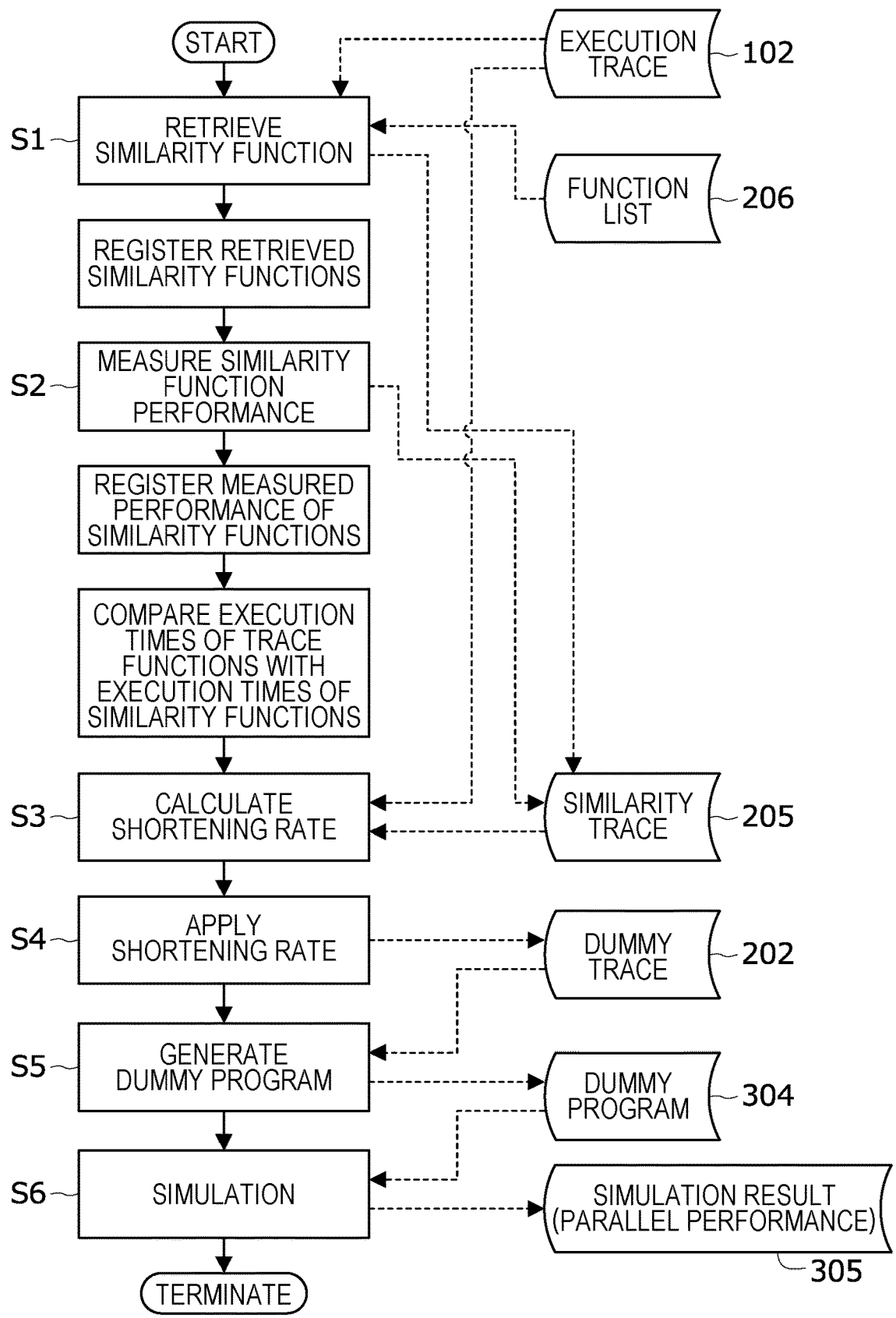
FIG. 16 is a flowchart explaining the processing in the information processing apparatus illustrated in FIG. 2.

The processing in the information processing apparatus 1 illustrated in FIG. 2 will be described according to the flowchart (steps S1 to S6) illustrated in FIG. 16.

Regarding each function included in the execution trace 102, the similarity function retrieval unit 111 retrieves a similarity function from the function list 206 (step S1). Then, the similarity function retrieval unit 111 registers the retrieved similarity functions in the similarity trace 205.

The similarity function performance measurement unit 112 measures performance (in other words, execution time) of the retrieved similarity functions (step S2). Then, the similarity function performance measurement unit 112 registers the measured performance of the similarity functions in the similarity trace 205.

The shortening rate calculation unit 113 compares the execution times of each of the functions in the execution trace 102 with the execution times of each of the similarity functions in the similarity trace 205 and calculates shortening rates for each of the similarity functions (step S3).

The shortening rate application unit 114 applies the minimum shortening rate out of the shortening rates for the calculated each similarity function to each similarity function by registering the minimum shortening rate to the dummy trace 202 (step S4).

The shortening rate application unit 114 generates the dummy program 304 based on the dummy trace 202 to which the minimum shortening rate is applied (step S5).

The CPU 11 of the information processing apparatus 1 (in other words, the "simulator 203" illustrated in FIG. 4 and the like) executes a simulation by executing the generated dummy program 304 (step S6). Then, the simulation result (in other words, the parallel performance of the program under development 101) 305 is obtained, and the processing is terminated.

[A-3] Effect

According to the information processing apparatus 1 in the example of the above-described embodiment, for example, the following effects may be obtained.

The shortening rate calculation unit 113 compares execution times for each of a plurality of functions in a case where the program under development 101 is executed in the program development execution environment 10 with execution times for each of a plurality of functions in a case of executing the program under development 101 in the simulation environment 20, and calculates shortening rates. The shortening rate application unit 114 generates a dummy program 304 to be used in the simulation environment 20 based on the shortening rate calculated by the shortening rate calculation unit 113 and the program under development 101.

In this way, it is possible to efficiently perform the performance evaluation of the program under development 101. Specifically, it is possible to evaluate the parallel performance of the program under development 101 in a short time while maintaining the configuration related to the parallel performance of the program under development 101.

The shortening rate application unit 114 generates the dummy program 304 by using the minimum shortening rate out of a plurality of shortening rates calculated for each of the plurality of functions.

In this way, the shortening rates of each of the similarity functions are able to be equalized.

The shortening rate application unit 114 generates the dummy program 304 based on a dummy trace 202 which records values obtained by multiplying processing times of each of the plurality of functions by the shortening rates.

In this way, a generation of the dummy program 304 is able to be appropriately performed.

The similarity function retrieval unit 111 retrieves a plurality of similarity functions similar to each of a plurality of functions included in a program under development 101 from a predetermined function list 206. The similarity function performance measurement unit 112 measures execution times in a case where similarity functions retrieved by the similarity function retrieval unit 111 are executed in a simulation environment 20. The shortening rate calculation unit 113 calculates shortening rates based on the execution times for each of the plurality of functions in the program development execution environment 10 and execution times for each of a plurality of similarity functions measured by the similarity function performance measurement unit 112.

In this way, the shortening rates are able to be appropriately calculated.

[B] Modification Example

FIG. 17 is a block diagram schematically illustrating a functional configuration of an information processing apparatus 1a in a modification example.

The information processing apparatus 1a in the modification example includes a CPU 11a illustrated in FIG. 17 in place of the CPU 11 included in the information processing apparatus 1 as an example of the embodiment illustrated in FIG. 3.

In addition to the functions as the similarity function retrieval unit 111, the similarity function performance measurement unit 112, the shortening rate calculation unit 113 and the shortening rate application unit 114 illustrated in FIG. 3, the CPU 11a includes functions as a function classification unit 115 and a function simplification unit 116.

The function classification unit 115 is an example of a classification processing unit. The function classification unit 115 classifies a plurality of functions included in the program under development 101 into non-exclusive processing, exclusive resource acquisition processing, and exclusive resource release processing. Details of functions in the function classification unit 115 will be described later with reference to FIG. 18 and the like.

The function simplification unit 116 is an example of a simplification processing unit. The function simplification unit 116 generates a simplified trace 402 that records continuous functions out of the functions classified as the non-exclusive processing by the function classification unit 115 as a single simplified function. Details of functions in the function simplification unit 116 will be described later with reference to FIG. 18 and the like.

Figure 18:
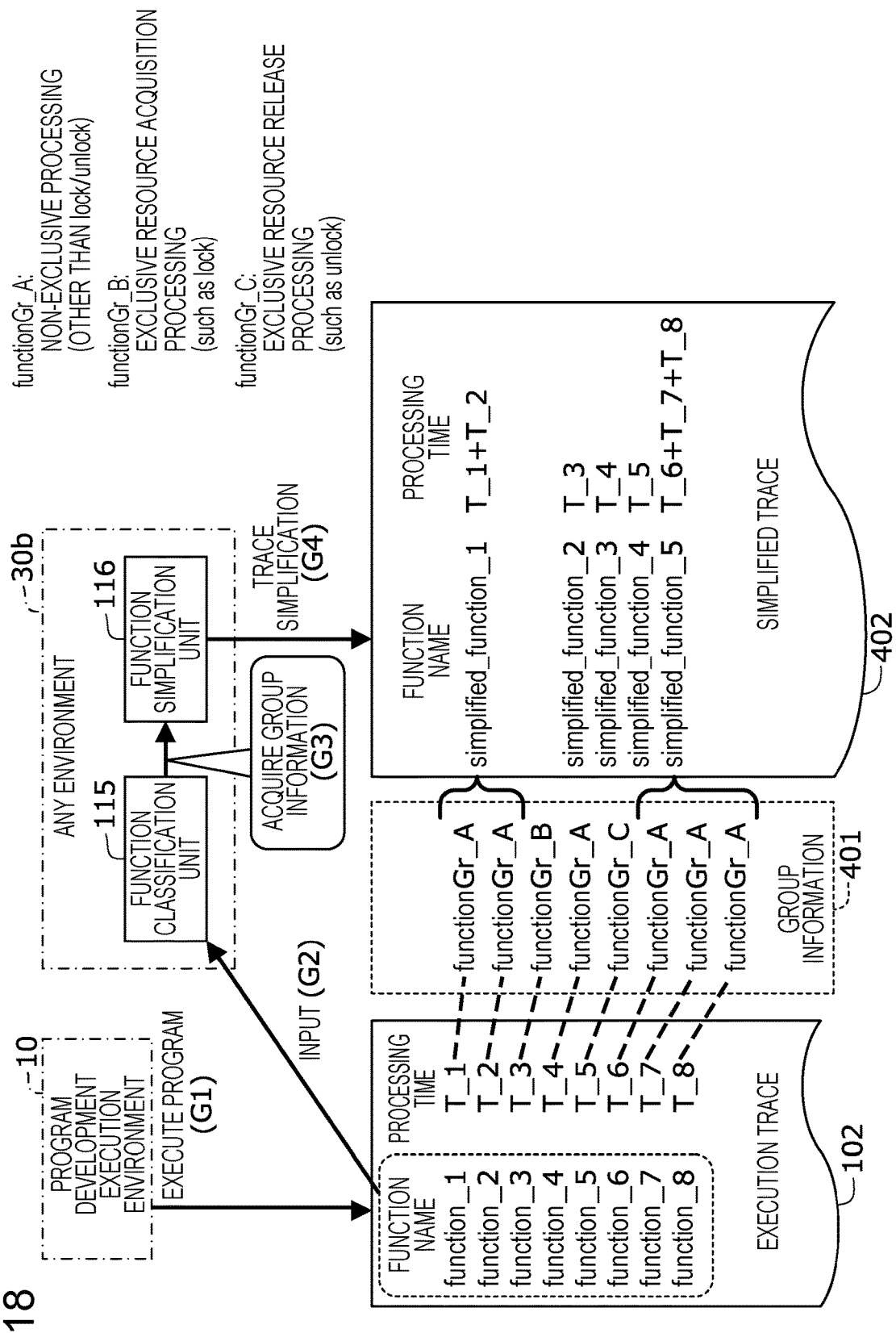
FIG. 18 is a block diagram explaining a generation process of a dummy trace in the information processing apparatus illustrated in FIG. 17.
Figure 19:
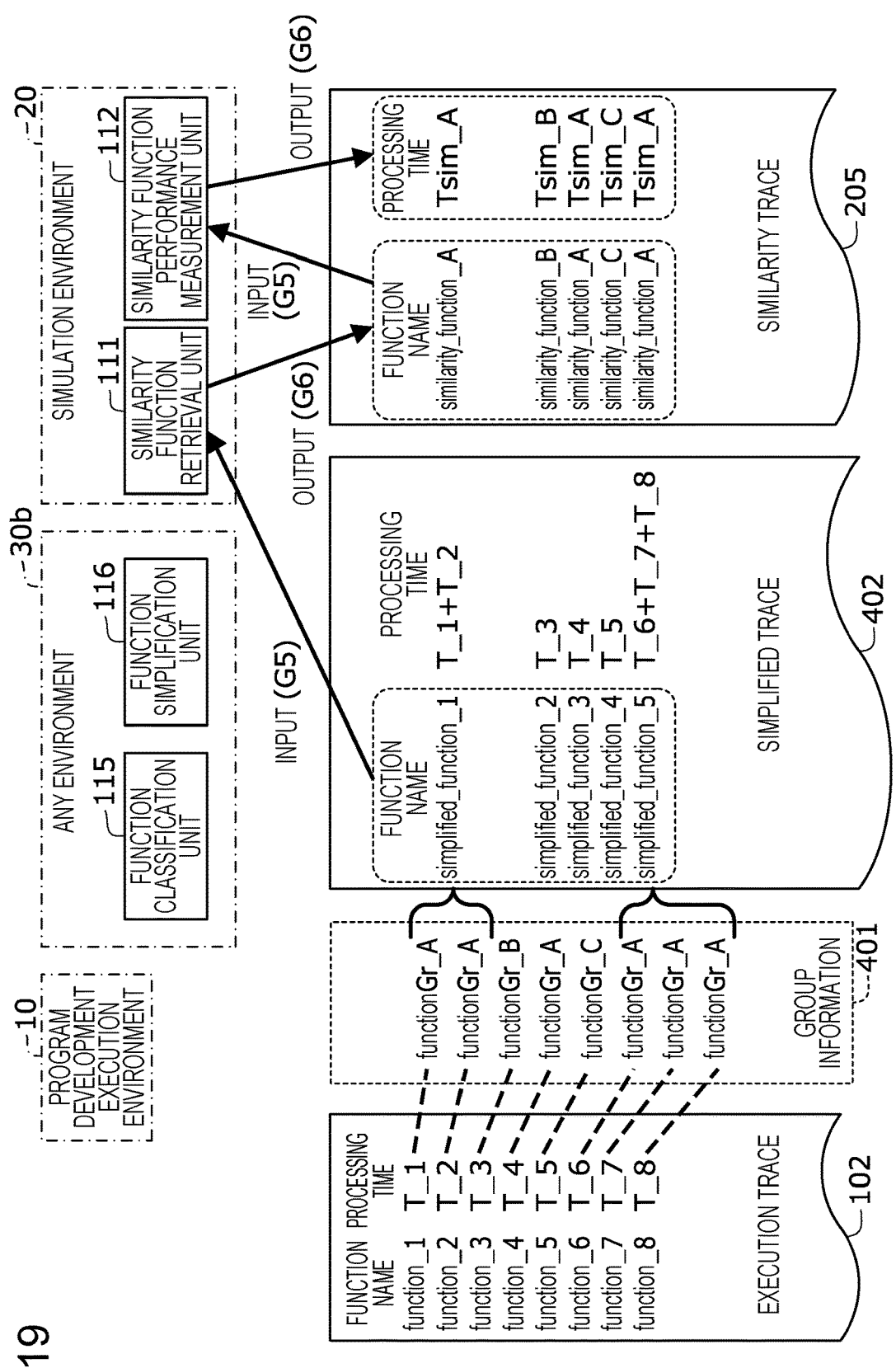
FIG. 19 is a block diagram explaining the generation process of the dummy trace in the information processing apparatus illustrated in FIG. 17.
Figure 20:
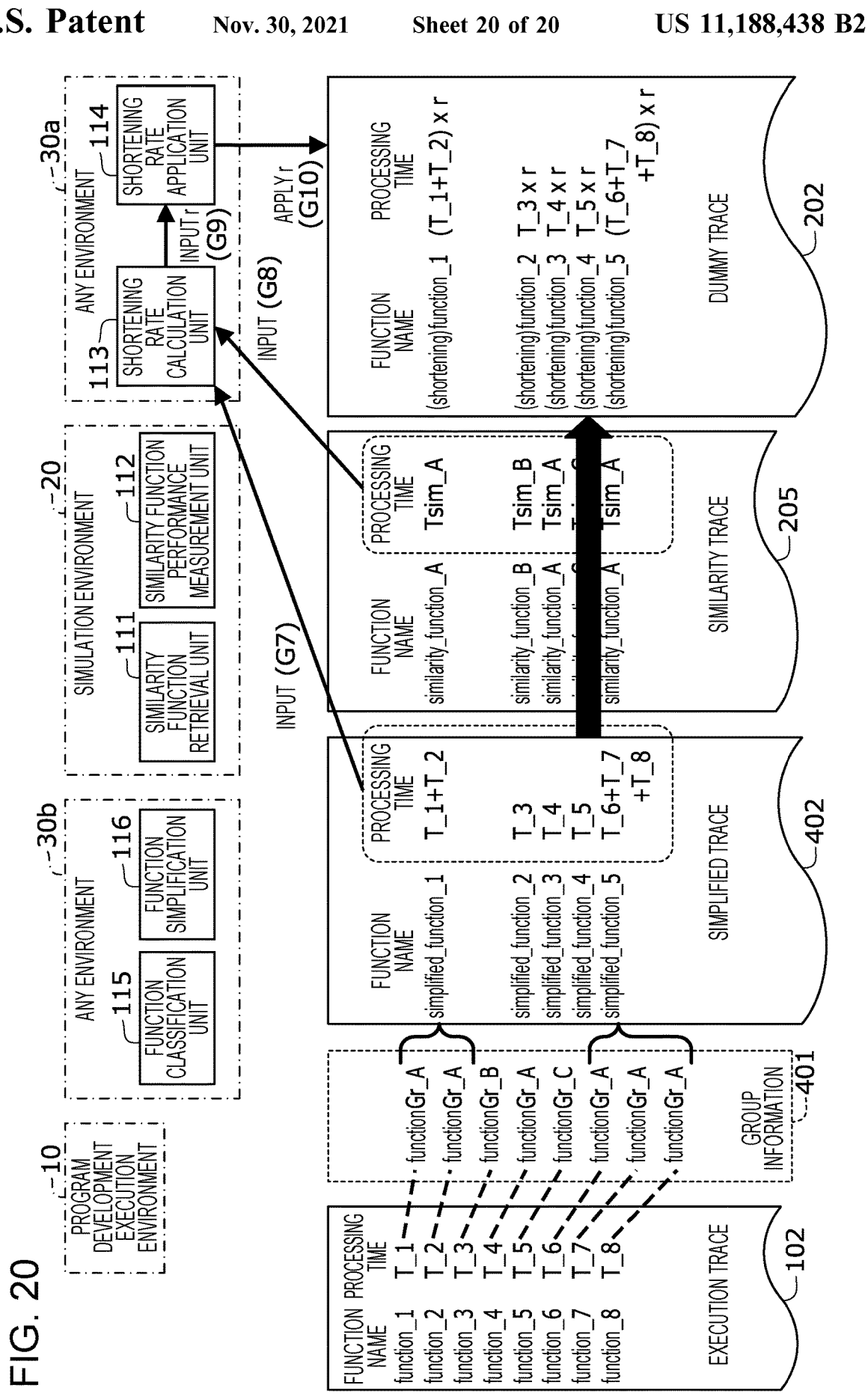
FIG. 20 is a block diagram explaining the generation process of the dummy trace in the information processing apparatus illustrated in FIG. 17.

FIGS. 18 to 20 are block diagrams explaining a generation process of a dummy trace 202 in the information processing apparatus 1a illustrated in FIG. 17.

As illustrated in FIG. 18, the program under development 101 is executed in the program development execution environment 10 (see reference sign G1 in FIG. 18). In this way, the execution trace 102 is generated.

In any environment 30b, the function classification unit 115 receives function names of the execution trace 102 as an input (see reference sign G2 in FIG. 18), classifies each function into a group, and generates group information 401.

In the example illustrated in FIG. 18, each function in the execution trace 102 is classified into one of a function_Gr_A indicating the non-exclusive processing, a function Gr_B indicating the exclusive resource acquisition processing, and a function_Gr_C indicating exclusive resource release processing. Specifically, in the example illustrated in FIG. 18, as indicated in the group information 401, a function_1, a function_2, a function_4, and a function_6 to a function_8 are classified into the function_Gr_A, a function_3 is classified as the function_Gr_B, and a function_5 is classified as the function_Gr_C. The non-exclusive processing indicates processing other than lock and unlock, the exclusive resource acquisition processing indicates processing such as lock, and the exclusive resource release processing indicates processing such as unlock.

The function simplification unit 116 acquires the group information 401 generated by the function classification unit 115 (see reference sign G3 in FIG. 18).

Based on the group information 401, the function simplification unit 116 simplifies the execution trace 102 and generates the simplified trace 402 (see reference sign G4 in FIG. 18). The function simplification unit 116 combines a plurality of continuous functions out of functions that are non-exclusive processing belonging to the function_Gr_A into one simplified function and registers the simplified function to the simplified trace 402.

In the example illustrated in FIG. 18, the function_1 and the function_2 in the execution trace 102 are combined in the simplified_function_1 in the simplified trace 402 and the function_6 to the function_8 in the execution trace 102 are combined in the simplified_function_5 in the simplified trace 402. The function_3 to function_5 in the execution trace 102 respectively correspond to the simplified_function_2 to the simplified_function_4 in the simplified trace 402.

The processing time of each simplified function in the simplified trace 402 is equal to the sum of the processing times of the corresponding functions in the execution trace 102. For example, the processing time of the simplified_function_1 in the simplified trace 402 is $T\_1+T\_2$ which is the sum of the processing times of the corresponding function_1 and function_2 in the execution trace 102. The processing time of the simplified_function_2 in the simplified trace 402 is $T\_3$ which is the processing time of the corresponding function_3 in the execution trace 102. The processing time of the simplified_function_3 in the simplified trace 402 is $T\_4$ which is the processing time of the corresponding function_4 in the execution trace 102. The processing time of the simplified_function_4 in the simplified trace 402 is $T\_5$ which is the processing time of the corresponding function_5 in the execution trace 102. The processing time of the simplified_function_5 in the simplified trace 402 is $T\_6+T\_7+T\_8$ which is the sum of the processing times of the corresponding function_6 to function_8 in the execution trace 102.

As illustrated in FIG. 19, in the simulation environment 20, the similarity function retrieval unit 111 receives each of simplified functions in the simplified trace 402 as an input (see reference sign G5 in FIG. 19).

The similarity function retrieval unit 111 retrieves similarity functions similar to the inputted simplified functions and outputs the retrieved similarity functions to the similarity trace 205 (see reference sign G6 in FIG. 19). In the example illustrated in FIG. 19, the similarity function retrieval unit 111 outputs the similarity_function_A to the similarity trace 205 as a function similar to the simplified_function_1, the simplified_function_3, and the simplified_function_5 in the simplified trace 402. The similarity function retrieval unit 111 outputs the simplified_function_B to the simplified trace 402 as a function similar to the simplified_function_2 in the simplified trace 402, and also outputs the simplified_function_C to the simplified trace 402 as a function similar to the simplified_function_4 in the simplified trace 402.

The similarity function performance measurement unit 112 receives each of the similarity functions in the similarity trace 205 as an input (see reference sign G5 in FIG. 19).

The similarity function performance measurement unit 112 measures the processing time of each inputted similarity function and outputs the measured processing time to the similarity trace 205 (see reference sign G6 in FIG. 19). In the example illustrated in FIG. 19, the similarity function performance measurement unit 112 outputs $T_{sim\_}A$, $T_{sim\_}B$, and $T_{sim\_}C$, respectively to the similarity trace 205 as the processing time of the similarity_function_A, the similarity_function_B, and the similarity_function_C.

As illustrated in FIG. 20, in any environment 30a, the shortening rate calculation unit 113 receives the processing times of each of the simplified functions in the simplified trace 402 as an input (see reference sign G7 in FIG. 20). The shortening rate calculation unit 113 receives the processing times of each of the similarity functions in the similarity trace 205 as an input (see reference sign G8 in FIG. 20).

The shortening rate calculation unit 113 compares the processing times of each of the simplified functions with the processing times of each of the similarity functions and calculates shortening rates of the similarity functions corresponding to each of the simplified functions. Then, the shortening rate calculation unit 113 inputs the shortening rates r of each of the calculated similarity functions to the shortening rate application unit 114 (see reference sign G9 in FIG. 20).

The shortening rate application unit 114 applies the minimum shortening rate r out of the shortening rates r of each of the input similarity functions to the dummy trace 202 (see reference sign G10 in FIG. 20).

In the example illustrated in FIG. 20, in the dummy trace 202, (T_1+T_2)×r is set in a processing time of a shortening_function_1, T_3×r is set in a processing time of a shortening_function_2, T_4×r is set in a processing time of a shortening_function_3. In the dummy trace 202, T_5×r is set in a processing time of a shortening_function_4, and (T_6+T_7+T_8)×r is set in a processing time of a shortening_function_5.

Regarding the function having the minimum shortening rate, the processing time in the dummy trace 202 is not shortened with respect to the processing time for the similarity trace 205. Therefore, parentheses are attached to "shortening" of "shortening function" in the function name of the dummy trace 202.

According to the information processing apparatus 1a in the modification example of the above-described embodiment, for example, the following effects may be obtained.

The function classification unit 115 classifies a plurality of functions included in the program under development 101 into non-exclusive processing, exclusive resource acquisition processing, and exclusive resource release processing. The function simplification unit 116 generates a simplified trace 402 that records continuous functions out of the functions classified as the non-exclusive processing by the function classification unit 115 as a single simplified function. The shortening rate calculation unit 113 calculates shortening rates based on execution times for each of the simplified functions included in the simplified trace 402 generated by the function simplification unit 116 and execution times for each of a plurality of similarity functions measured by the similarity function performance measurement unit 112.

As a result, the shortening rate applied to the dummy trace 202 may be increased, and the number of lines of the dummy trace 202 may be reduced. A simulation of the program under development 101 may be completed in a short time.

[C] Other

The disclosed technology is not limited to the above-described embodiment, and various modifications may be made without departing from the gist of the present embodiment. Each configuration and each process of the present embodiment may be selected as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and the processor configured to:
calculate shortening rates by subtracting from one (1) a quotient obtained by dividing execution times for each of a plurality of functions, in a case where an evaluation target program is executed in a simulation environment, by execution times for each of the plurality of functions, in a case where an evaluation target program is executed in an execution environment, and
generate a simulation program to be used in the simulation environment based on the calculated shortening rates and the evaluation target program.

2. The information processing apparatus according to claim 1, wherein the processor generates the simulation program using a minimum shortening rate out of a plurality of shortening rates calculated for each of the plurality of functions.

3. The information processing apparatus according to claim 1, wherein the processor generates the simulation program based on a dummy trace which records values obtained by multiplying processing times for each of the plurality of functions by the shortening rates.

4. A computer-readable recording medium storing therein a program for causing a computer to execute a process, the process comprising:
calculating shortening rates by subtracting from one (1) a quotient obtained by dividing execution times for each of a plurality of functions, in a case where an evaluation target program is executed in a simulation environment, by execution times for each of the plurality of functions in a case where an evaluation target program is executed in an execution environment; and
generating a simulation program to be used in the simulation environment based on the calculated shortening rates and the evaluation target program.

5. The computer-readable recording medium storing therein a program according to claim 4, the process further comprising:
generating the simulation program using a minimum shortening rate out of the plurality of shortening rates calculated for each of the plurality of functions.

6. The computer-readable recording medium storing therein a program according to claim 4, the process further comprising:
generating the simulation program based on a dummy trace which records values obtained by multiplying processing times for each of the plurality of functions by the shortening rate.

7. An information processing method executed by a computer, comprising:
- retrieving a plurality of similarity functions from a function list;
- registering each of the plurality of similarity functions in a similarity trace;
- measuring an execution time of each of the plurality of similarity functions;
- registering the execution time of each of the plurality of similarity functions in the similarity trace; and
- calculating a shortening rate for each of the plurality of similarity functions by subtracting from one (1) a quotient obtained by dividing execution times for each of the plurality of similarity functions, in a case where an evaluation target program is executed in a simulation environment, by execution times for each of the plurality of similarity functions in a case where an evaluation target program is executed in an execution environment.

8. The information processing method of claim 7, wherein the calculating comprises comparing the execution time of each of the plurality of similarity functions with an execution time of each of a plurality of functions stored in an execution trace.

9. The information processing method of claim 7, further comprising applying the shortening rate to each of the plurality of similarity functions.

10. The information processing method of claim 9, further comprising generating a dummy program based on a dummy trace to which the shortening rate is applied.

11. The information processing method of claim 10, further comprising executing a simulation by executing the dummy program.

* * * * *